United States Patent
Lenz et al.

(10) Patent No.: US 9,793,809 B1
(45) Date of Patent: Oct. 17, 2017

(54) SAFETY CROWBAR FOR VOLTAGE CONVERTERS

(71) Applicant: Infineon Technologies AG, Neubiberg (DE)

(72) Inventors: Michael Lenz, Zorneding (DE); Cristian Garbossa, Bressanone (IT); Marco Piselli, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/294,188

(22) Filed: Oct. 14, 2016

(51) Int. Cl.
*H02M 3/158* (2006.01)
*H02H 3/20* (2006.01)
*H02H 7/12* (2006.01)

(52) U.S. Cl.
CPC ............ *H02M 3/158* (2013.01); *H02H 3/202* (2013.01); *H02H 7/1213* (2013.01)

(58) Field of Classification Search
CPC ...... H02M 3/155; H02M 3/156; H02M 3/158; H02M 2003/158; H02H 1/0007; H02H 3/202; H02H 3/26; H02H 7/1213
See application file for complete search history.

(56) References Cited

U.S. PATENT DOCUMENTS

| | | | | |
|---|---|---|---|---|
| 5,726,849 A | * | 3/1998 | Nakamura | H02J 1/102 361/93.5 |
| 8,344,710 B2 | * | 1/2013 | Sriram | H02M 3/28 323/222 |
| 8,766,478 B2 | * | 7/2014 | Liu | H02J 4/00 307/39 |
| 2013/0093489 A1 | * | 4/2013 | Lin | H03K 7/08 327/306 |
| 2014/0362479 A1 | * | 12/2014 | Park | H02M 1/32 361/18 |

OTHER PUBLICATIONS

"Road vehicles—Functional safety—Part 1: Vocabulary," ISO 26262-1:2011(E), International Standard, Nov. 15, 2011, 30 pp.

* cited by examiner

*Primary Examiner* — Matthew Nguyen
(74) *Attorney, Agent, or Firm* — Shumaker & Sieffert, P.A.

(57) ABSTRACT

In one example, a circuit includes a first voltage converter and a second voltage converter. The first voltage converter is configured to convert a first voltage to a second voltage, determine whether the first voltage converter is operating in an unsafe state, and output an indication that the first voltage converter is operating in the unsafe state. The second voltage converter is configured to selectively activate a high side switch and a low side switch to convert the second voltage to a third voltage. In response to receiving the indication that the first voltage converter is operating in the unsafe state, the second voltage converter is further configured to activate the high side switch and the low side switch to establish an electrical path between the second voltage and a reference node of the circuit.

20 Claims, 6 Drawing Sheets

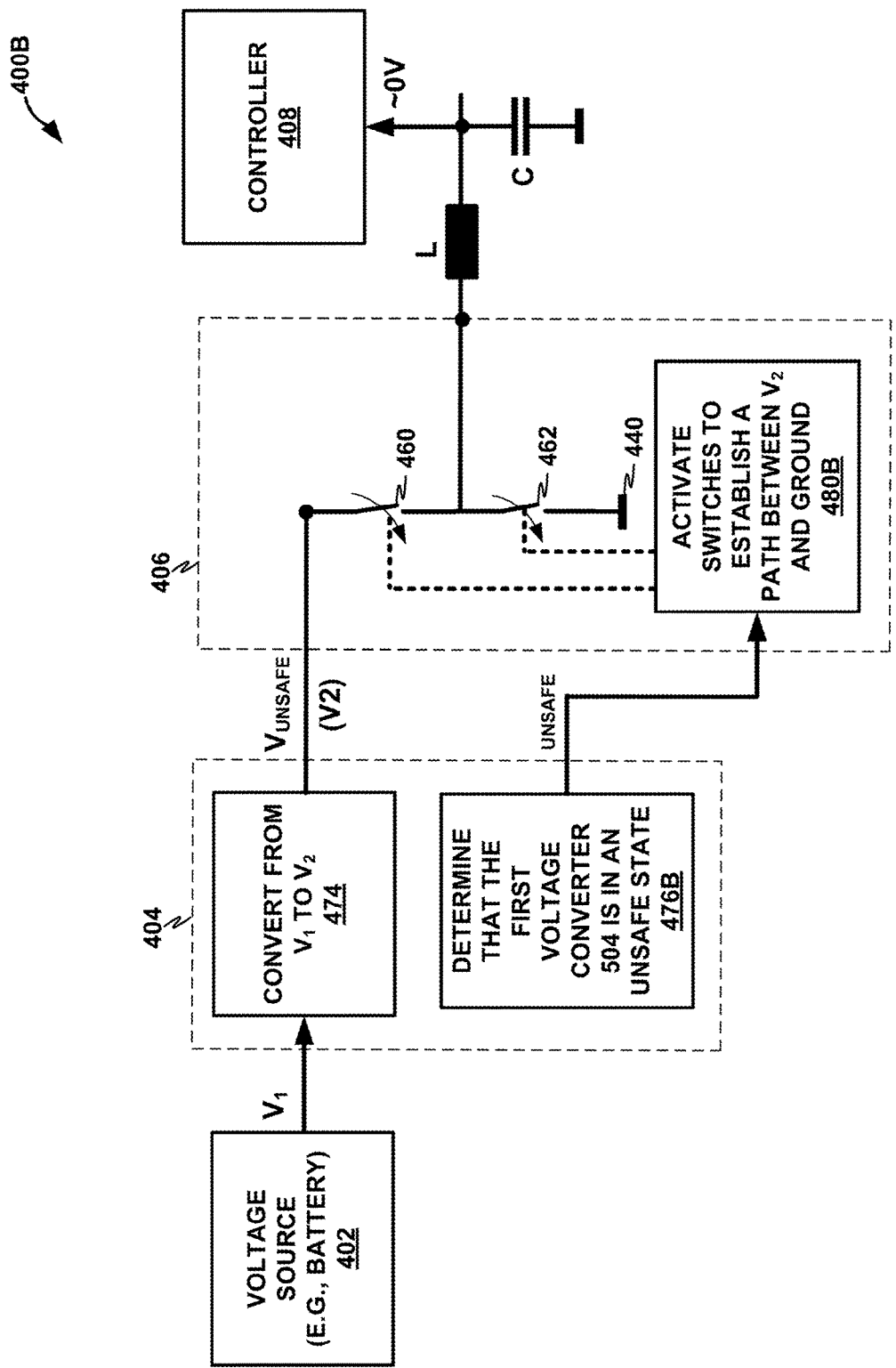

US 9,793,809 B1

SAFETY CROWBAR FOR VOLTAGE CONVERTERS

TECHNICAL FIELD

This disclosure relates to voltage converters, such as direct current (DC) to DC converters.

BACKGROUND

A voltage converter may be used to output a voltage that is different from a received voltage. For example, a first buck converter receives a voltage from a battery and reduces the voltage from the battery to a first voltage. In the example, a second buck converter receives the first voltage output from the first buck converter and further reduces the first voltage further to a second voltage that is suitable for use by a microcontroller or to activate components, such as a relays or solenoids.

SUMMARY

In general, this disclosure is directed to techniques for ensuring that systems operate in a safe state. A safe state may refer to instances where voltages output from voltage converters of the system are less than breakdown voltages of the system. For example, rather than propagating an overvoltage from a first voltage converter to a second voltage converter, the first voltage converter may output, to the second voltage converter, an indication of an unsafe state (e.g., overvoltage) to cause the second voltage converter to "crowbar" the voltage output from the first voltage converter. As used herein, crowbar may refer to instances where a circuit rapidly short-circuits a voltage rail to a ground of the circuit.

In one example, a circuit includes a first voltage converter and a second voltage converter. The first voltage converter is configured to convert a first voltage to a second voltage, determine whether the first voltage converter is operating in an unsafe state, and in response to determining that the first voltage converter is operating in the unsafe state, output an indication that the first voltage converter is operating in the unsafe state. The second voltage converter is configured to selectively activate a high side switch and a low side switch to convert the second voltage to a third voltage. In response to receiving the indication that the first voltage converter is operating in the unsafe state, the second voltage converter is further configured to refrain from selectively activating the high side switch and the low side switch to convert the second voltage to the third voltage and activate the high side switch and the low side switch to establish an electrical path between the second voltage and a reference node of the circuit.

In another example, a method includes determining, by a first voltage converter configured to convert a first voltage to a second voltage, whether the first voltage converter is operating in an unsafe state. In response to determining that the first voltage converter is operating in the unsafe state, the method includes outputting, by the first voltage converter to a second voltage converter configured to convert the second voltage to a third voltage, an indication that the first voltage converter is operating in the unsafe state. In response to the second voltage converter receiving the indication that the first voltage converter is operating in the unsafe state, the method includes establishing, by a high side switch and a low side switch of the second voltage converter, an electrical path between the first voltage and a reference node.

In another example, a system includes a first voltage converter and a second voltage converter. The first voltage converter is configured to convert a first voltage to a second voltage, determine whether the first voltage converter is operating in an unsafe state, and in response to determining that the first voltage converter is operating in the unsafe state, output an indication that the first voltage converter is operating in the unsafe state. The second voltage converter is configured to receive the second voltage and the indication that the first voltage converter is operating in the unsafe state from the first voltage converter and selectively activate a set of high side switches and a set of low side switches to convert the second voltage to a set of voltages. In response to receiving the indication that the first voltage converter is operating in the unsafe state, the second voltage converter is further configured to refrain from selectively activating the set of high side switches and the set of low side switches to convert the second voltage to the set of voltages and activate the set of high side switches and the set of low side switches to establish an electrical path between the second voltage and a reference node of the circuit.

Details of these and other examples are set forth in the accompanying drawings and the description below. Other features, objects, and advantages will be apparent from the description and drawings, and from the claims.

BRIEF DESCRIPTION OF DRAWINGS

FIG. 4B is a block diagram illustrating a system using a safety crowbar when the first voltage converter of FIG. 4A is operating in an unsafe state, in accordance with one or more techniques of this disclosure.

DETAILED DESCRIPTION

Some circuits and circuit systems may propagate an overvoltage from a first voltage converter to a second voltage converter. For example, the first voltage converter may fail to decrease (i.e., buck) a battery voltage received by the first voltage converter. In the example, the second voltage converter receives the battery voltage and decreases the battery voltage. However, because the second voltage converter is configured to receive a voltage that is less than the battery voltage, the second voltage converter outputs a voltage that may be unsafe for components using the voltage output from the second voltage converter. More specifically, a microcontroller and actuators may receive the unsafe voltage from the second voltage converter, thereby resulting in dielectric breakdown in the microcontroller and/or actuators. Further, in some systems, an event data recorder (e.g., "black box") may be damaged by the unsafe voltage, which may destroy state information. As such, a system that propagates an overvoltage from a first voltage converter to a second voltage converter may result in an unsafe operation of the system and a destruction of state information suitable to determine the cause of the unsafe operation of the system.

In accordance with one or more techniques of this disclosure, some examples may use a safety crowbar to reduce an unsafe voltage output by a voltage converter, rather than propagate the overvoltage to other voltage converters. As used herein, a safety crowbar may refer to instances where a circuit activates a switch to rapidly short-circuit an output to a ground of the circuit. For example, a first voltage converter may output an indication of an unsafe state (e.g., that the first voltage converter outputs a battery voltage) and, in response to receiving the indication, a second voltage converter may crowbar the voltage output from the first voltage converter. In this manner, even in instances where the second voltage converter receives the battery voltage, the second voltage converter outputs a voltage that is safe for components using the voltage output from the second voltage converter. More specifically, a microcontroller and actuators may receive, rather than an unsafe voltage that exceeds a dielectric breakdown in the microcontroller and/or actuators, a voltage approximately equal to ground. Further, in some systems, state information stored in an event data recorder (e.g., "black box") may be available after the second voltage converter crowbars the voltage output from the first voltage converter. In this manner, a system that uses a safety crowbar to reduce an unsafe voltage output by a voltage converter may ensure safe operation of the system during a failure of the system and an availability of state information to determine the cause of the failure of the system.

Figure 1:
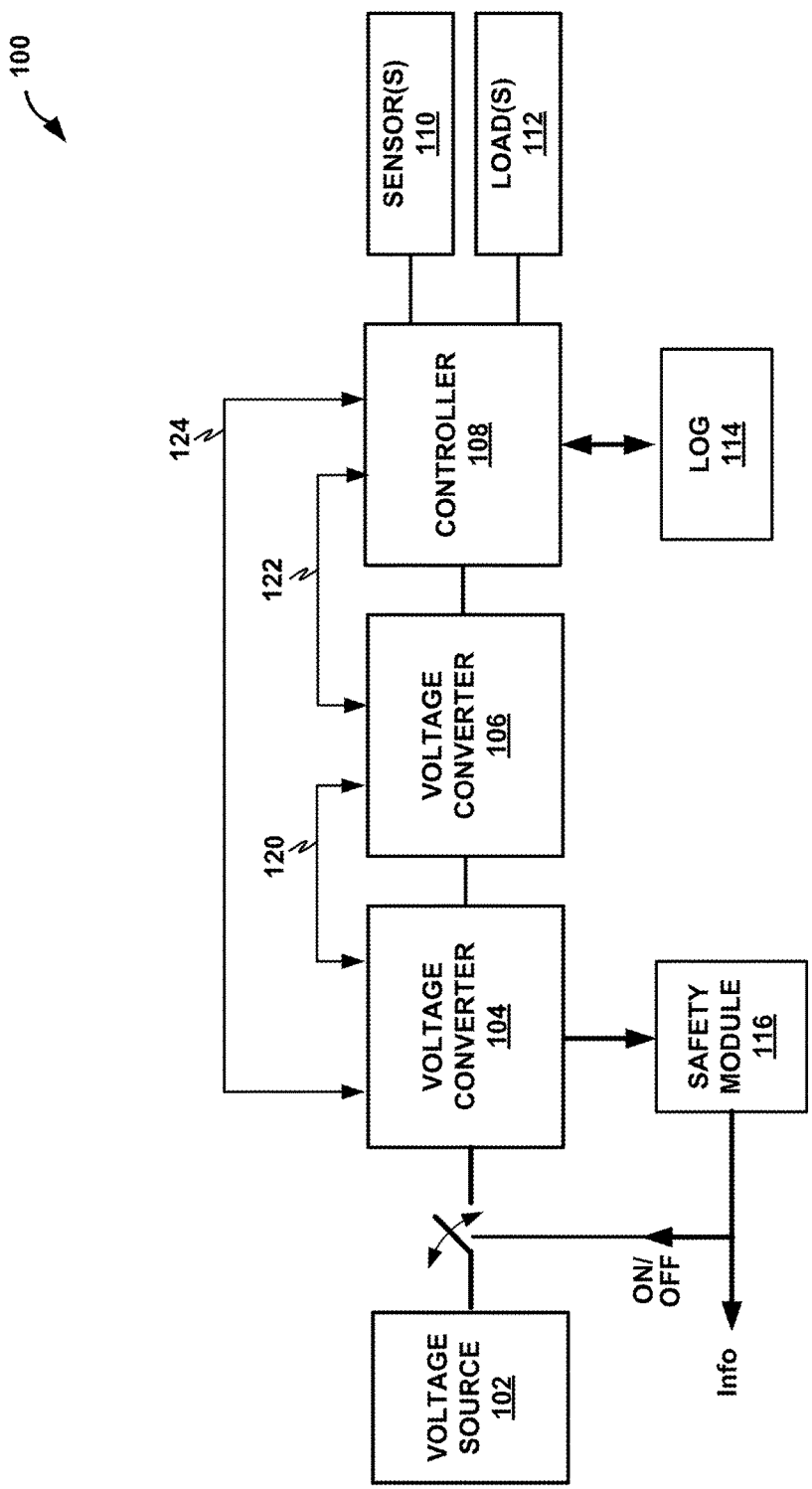
FIG. 1 is a block diagram illustrating a system using a safety crowbar, in accordance with one or more techniques of this disclosure.

FIG. 1 is a block diagram illustrating a system 100 using a safety crowbar, in accordance with one or more techniques of this disclosure. As illustrated in the example of FIG. 1, system 100 may include voltage source 102, voltage converter 104, voltage converter 106, controller 108, sensor 110, load 112, log 114, and safety module 116. Voltage converter 106 may be configured to provide a safety crowbar, for instance, by being configured to activate a high side switch and a low side switch that rapidly short-circuits an output of voltage converter 104 to a ground of system 100.

Voltage source 102 may be configured to provide electrical power to one or more other components of switching system 100. For instance, voltage source 102 may be configured to supply electrical power to load 112 and/or controller 108. In some examples, voltage source 102 may be an output of a one or more battery cells. Examples of battery cells may include lead-acid, nickel metal hydride, lithium ion, or other types of battery cells. In some examples, voltage source 102 may be an output of a power converter, such as a rectifier. For instance, voltage source 102 may be a rectified ac output. Examples rectifiers may include, but are not limited to, single-phase rectifier (e.g., half wave, full wave, or the like), three-phase rectifier (e.g., half wave, full wave, bridge, or the like), or other types of rectifiers. In some examples, voltage source 102 may represent a connection to an electrical grid. For instance, voltage source 102 may be a rectified output of an AC to DC power converter receiving a $V_{AC}$ from an electrical grid (e.g., 120 $V_{AC}$ at 60 Hz, 230 $V_{AC}$ at 50 Hz, or another output from an electrical grid).

Voltage converter 104 may include switch-mode power converters, linear regulators, or other converters. Examples of switch-mode power converters may include, but are not limited to, flyback, buck-boost, buck, Ćuk, or another switch-mode power converter. In some examples, voltage converter 104 may receive a voltage and output a voltage that is different from the received voltage. For instance, voltage converter 104 may receive a battery voltage from voltage source 102 and output, to voltage converter 106, a first voltage that is less than the battery voltage. More specifically, in some examples, voltage converter 104 may be a buck converter that bucks (e.g., reduces) a battery voltage received from voltage source 102. In some examples, voltage converter 104 may determine whether first voltage converter 104 is operating in an unsafe state. For example, voltage converter 104 may determine that first voltage converter 104 is operating in the unsafe state when a voltage output by first voltage converter 104 exceeds a threshold voltage. In some examples, voltage converter 104 may determine that first voltage converter 104 is operating in the unsafe state in response to determining that a switch of first voltage converter 104 fails to deactivate (e.g., operate in an open state).

As used herein, a switch may include, but is not limited to, silicon controlled rectifier (SCR), a Field Effect Transistor (FET), and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of BJTs may include, but are not limited to, PNP, NPN, heterojunction, or any other type of BJT, or any combination of the same. It should be understood that a switch may be a high side switch or low side switch. Additionally, a switch may be voltage-controlled and/or current-controlled. Examples of current-controlled switching elements may include, but are not limited to, gallium nitride (GaN) MOSFETs, BJTs, or other current-controlled elements.

Voltage converter 106 may include one or more switch-mode power converters including, but are not limited to, flyback, buck-boost, buck, Ćuk, or another switch-mode power converter. In some examples, voltage converter 106 may receive a voltage and output a voltage that is different from the received voltage. For instance, voltage converter 106 may receive a first voltage from voltage converter 104 and output, to controller 108, a second voltage that is less than the first voltage. More specifically, in some examples, voltage converter 106 may be a multiple buck converter that bucks (e.g., reduces) a first voltage received from voltage converter 104 into a set of second voltages that are each less than the first voltage received from voltage converter 104. In some examples, voltage converter 106 may include a half-bridge circuit that includes a high side switch and a low side switch.

Controller 108 may be configured to activate load 112. For example, controller 108 may cause a switch to establish an electrical path between load 112 and a voltage output by voltage converter 106 based on sensor data received from sensor 110. In some examples, controller 108 may store state information in log 114. For example, controller 108 may cause log 114 to store an indication of one or more electrical characteristics of system 100 in log 114. For instance, controller 108 may cause log 114 to store an indication of a voltage output by voltage converter 104 and one or more voltages output by voltage converter 106. In some examples, controller 108 may be a microcontroller on a single integrated circuit containing a processor core, memory, inputs, and outputs. For example, controller 108 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 108 may be a combination of one or more analog components and one or more digital components.

Sensor 110 may include any sensor suitable for system 100. For example, sensor 110 may include magnetic sensors, optical sensors, voltage sensors, current sensors, or other types of sensors. Examples of magnetic sensors may include, but are not limited to, X-magneto-resistive (XMR), Hall effect, or other types of magnetic sensors. In some examples, sensor 110 may include multiple sensors. For instance, sensor 110 may include at least one sensor for each load of load 112.

Load 112 may comprise any suitable load for system 100. In some examples, load 112 may include at least one actuator. For instance, load 112 may include a relay, solenoid, motor, pump, or another actuator. In some examples, load 112 may generally represent multiple loads. For instance, load 112 may include at least one load for each voltage output by voltage converter 106.

Log 114 may comprise a memory configured to store state information. As used herein, state information may include data associated with an operation of system 100. Examples of state information may include, but are not limited to, a voltage output by voltage converter 104, one or more voltages output by voltage converter 106, a current output by voltage converter 104, one or more currents output by voltage converter 106, a current output to load 112, sensor data from sensor 110, a voltage output by voltage source 102, or other state information. Log 114 may be read-only memory (ROM). Examples of ROM may include, but are not limited to, one of or a combination of erasable programmable ROM (EPROM), electrically erasable programmable ROM (EEPROM), programmable ROM (PROM), flash ROM, or another ROM.

Safety module 116 is configured to provide a safety path for voltage converter 104. For example, when safety module 116 is off (e.g., deactivated), safety module 116 refrains from disconnecting the input of voltage converter 104 from voltage source 102 (e.g., a battery) of system 100. However, when safety module 116 is on (e.g., activated), safety module 116 disconnects the input of voltage converter 104 from voltage source 102 (e.g., a battery) of system 100. In this manner, components of system 100 may be protected from an unsafe voltage from voltage source 102.

In accordance with one or more techniques of this disclosure, rather than propagating the overvoltage to other voltage converters, system 100 may output an indication of an unsafe state on lines 120-124 to activate a safety crowbar. For example, in response to determining that voltage converter 104 is operating in an unsafe state, voltage converter 104 may output, at line 120, to voltage converter 106, and indication (e.g., a logical '1') that voltage converter 104 is operating in the unsafe state.

In some examples, in response to determining that voltage converter 104 is operating in an unsafe state, voltage converter 104 may output, at line 124, to controller 108, and indication (e.g., a logical '1') that voltage converter 104 is operating in the unsafe state. In the example, controller 108 may cause log 114 to store an indication that voltage converter 104 is operating in the unsafe state with a corresponding indication of a time (e.g., a time stamp). Similarly, in response to determining that voltage converter 106 is operating in an unsafe state, voltage converter 106 may output, at line 122, to controller 108, and indication (e.g., a logical '1') that voltage converter 106 is operating in the unsafe state. In instances where an overvoltage occurs in voltage converter 106, controller 108 may communicate to voltage converter 104 to switch off to ensure that voltage converter 106 operates in a safe state. In the example, controller 108 may cause log 114 to store an indication that voltage converter 106 is operating in the unsafe state with a corresponding indication of a time (e.g., a time stamp). In this manner, a safety of system 100 may be improved, because an unsafe state of voltage converter 104 may be, using lines 120-124, mitigated by a safety crowbar operation of voltage converter 106. Additionally, state information relating to the operation of system 100 may be preserved because the safety crowbar operation of voltage converter 106 may reduce the possibility of data loss in log 114.

Figure 2:
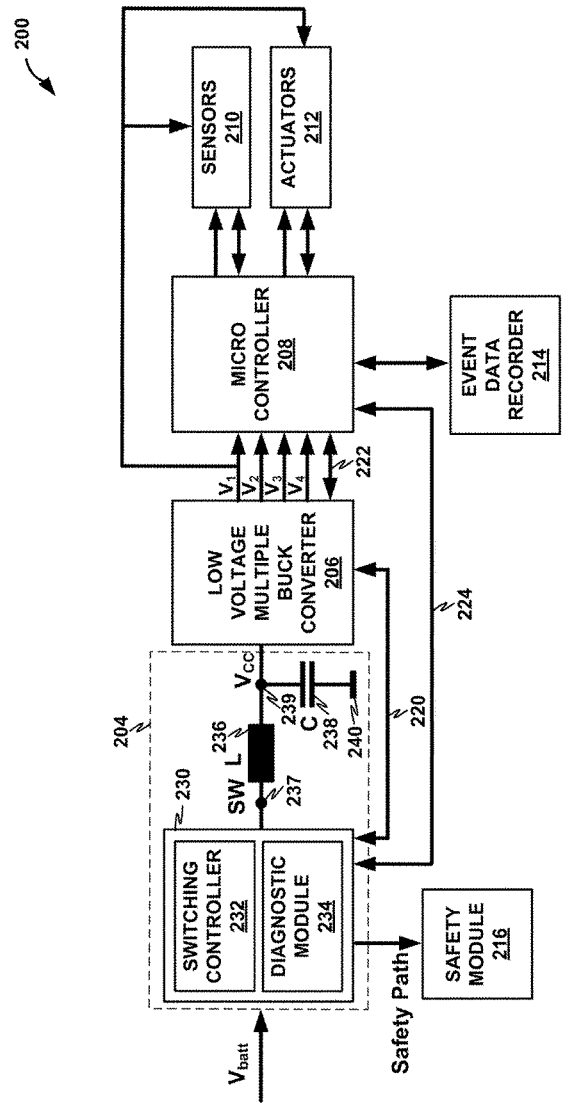
FIG. 2 is a block diagram illustrating a circuit using a safety crowbar, in accordance with one or more techniques of this disclosure.

FIG. 2 is a block diagram illustrating a circuit 200 using a safety crowbar, in accordance with one or more techniques of this disclosure. FIG. 2 is described below within the context of system 100 of FIG. 1. However, the techniques described below can be used in any permutation, and in any combination, with voltage source 102, voltage converter 104, voltage converter 106, controller 108, sensor 110, load 112, log 114, and safety module 116. As illustrated in the example of FIG. 2, circuit 200 may include high voltage converter 204, low voltage buck converter 206, microcontroller 208, sensor 210, actuators 212, event data recorder 214, and safety module 216. Sensor 210 may be an example of sensor 110 of FIG. 1, actuators 212 may be an example of load 112 of FIG. 1, and event data recorder 214 may be an example of log 114 of FIG. 1.

High voltage converter 204 may be an example of voltage converter 104 of FIG. 1. For example, high voltage converter 204 may be a buck converter that bucks a voltage (e.g., $V_{batt}$). As shown, high voltage converter 204 may include switching controller 232, diagnostic module 234, inductive element 236, and capacitive element 238.

Switching controller 232 may be configured to selectively activate one or more switches of high voltage converter 204 to convert a voltage received by high voltage converter 204 (e.g., $V_{batt}$) to another voltage (e.g., $V_{CC}$). For example, high voltage converter 204 may convert the voltage received by high voltage converter 204 (e.g., $V_{batt}$) to another voltage (e.g., $V_{CC}$) by establishing an electrical path (e.g., activating a switch) between the voltage received by high voltage converter 204 (e.g., $V_{batt}$) and first node 237 of the inductive element 236 during a first portion of a duty cycle and refraining from establishing the electrical path between (e.g., deactivating the switch) the voltage received by high voltage converter 204 (e.g., $V_{batt}$) and first node 237 of inductive element 236 during a second portion of the duty cycle. As shown, capacitive element 238 has a first node coupled to a second node 239 of inductive element 236 and a second node coupled to a reference node 240 of circuit 200. As used herein, a reference node may refer to an earth ground, common ground, or other reference node of a circuit. In the example of FIG. 2, capacitive element 238 outputs the voltage converted by high voltage converter 204 (e.g., $V_{CC}$). In some examples, switching controller 232 may be configured to convert the voltage received by high voltage converter 204 (e.g., $V_{batt}$) to another voltage (e.g., $V_{CC}$) by outputting, to a switch, a signal indicating a target duty cycle that selectively activates the switch to convert the voltage received by high voltage converter 204 (e.g., $V_{batt}$) to another voltage (e.g., $V_{CC}$). For instance, switching controller 232 may output, to a switch, a signal indicating a target duty cycle of 50% that selectively activates the switch (e.g., 50% of a duty cycle) to convert the voltage received by high voltage converter 204 (e.g., $V_{batt}$) to a voltage equal to half the voltage received by high voltage converter 204.

Diagnostic module 234 may determine whether high voltage converter 204 is operating in an unsafe state. For example, diagnostic module 234 may determine whether the voltage output by high voltage converter 204 (e.g., $V_{CC}$) exceeds a threshold voltage. The threshold voltage may be predefined, for instance, to be a percentage (e.g., greater than 70%) of a voltage received by high voltage converter 204 (e.g., $V_{batt}$), a percentage (greater than 110%) of a target voltage to be output by high voltage converter 204 (e.g., $V_{CC}$), or another threshold voltage. In some examples, one or more comparators of diagnostic module 234 may determine whether the voltage output by high voltage converter 204 (e.g., $V_{CC}$) exceeds the threshold voltage. In any case, in response to determining that the voltage output by high voltage converter 204 (e.g., $V_{CC}$) exceeds the threshold voltage, diagnostic module 234 may determine that high voltage converter 204 is operating in the unsafe state.

In some examples, diagnostic module 234 may determine whether high voltage converter 204 is operating in an unsafe state based on a voltage at first node 237 of inductive element 236 when switching controller 232 refrains from establishing an electrical path between (e.g., deactivating a switch) the voltage received by high voltage converter 204 (e.g., $V_{batt}$) and first node 237 of inductive element 236. For example, diagnostic module 234 may determine whether a voltage at first node 237 of inductive element 236 exceeds a threshold voltage during the second portion of the duty cycle, when switching controller 232 refrains from establishing an electrical path between (e.g., deactivating a switch) the voltage received by high voltage converter 204 (e.g., $V_{batt}$) and first node 237 of inductive element 236. The threshold voltage may be predefined, for instance, to be a percentage (e.g., greater than 50%, 60%, 70%, or another percentage) of a voltage received by high voltage converter 204 (e.g., $V_{batt}$). In the example, in response to determining that the voltage at first node 237 of inductive element 236 exceeds the threshold voltage during the second portion of the duty cycle, diagnostic module 234 determines that high voltage converter 204 is operating in the unsafe state.

In some examples, diagnostic module 234 may determine whether high voltage converter 204 is operating in an unsafe state based on a target duty cycle output by switching controller 232. For example, diagnostic module 234 may detect a duty cycle of a switch of high voltage converter 204 that is controlled by a duty cycle output by switching controller 232. In the example, diagnostic module 234 may determine that high voltage converter 204 is operating in the unsafe state based on the detected duty cycle of the switch. In the example, diagnostic module 234 may determine that high voltage converter 204 is operating in the unsafe state based on a comparison of the detected duty cycle of the switch. For instance, diagnostic module 234 may determine that high voltage converter 204 is operating in the unsafe state when the detected duty cycle of the switch is substantially different from the target duty cycle output by switching controller 232. As used herein, a detected duty cycle and a target duty cycle may be substantially different when the detected duty cycle is not within 10% of the target duty cycle. Additionally, or alternatively, diagnostic module 234 may determine that high voltage converter 204 is operating in the unsafe state when the detected duty cycle of the switch indicates that the switch is activated (e.g., closed state) when the target duty cycle output by switching controller 232 indicates an instruction to deactivate (e.g., open state) the switch. In some examples, diagnostic module 234 may determine whether high voltage converter 204 is operating in an unsafe state based on an output of a comparator. For instance, diagnostic module 234 may determine that high voltage converter 204 is operating in an unsafe state when the output of the comparator indicates that the high voltage converter 204 is operating in an unsafe state.

Diagnostic module 234 may output an indication that high voltage converter 204 is operating in the unsafe state in response to determining that high voltage converter 204 is operating in the unsafe state. For example, in response to determining that high voltage converter 204 is operating in the unsafe state, diagnostic module 234 may output, via line 220, a logical '1' to indicate that high voltage converter 204 is operating in the unsafe state. Additionally, or alternatively, in response to determining that high voltage converter 204 is operating in the unsafe state, diagnostic module 234 may output, via line 224, a logical '1' to indicate that high voltage converter 204 is operating in the unsafe state.

In some examples, diagnostic module 234 may be configured to output, to microcontroller 208, state information for high voltage converter 204 and microcontroller 208 is configured to receive the state information for high voltage converter 204. For example, as shown, diagnostic module 234 may communicate with microcontroller 208 via line 224. In some examples, line 224 may be bi-directional. For instance, diagnostic module 234 may communicate with microcontroller 208 via line 224 and microcontroller 208 may also communicate (e.g., simultaneously) with diagnostic module 234. In some examples, line 224 may be unidirectional. For instance, diagnostic module 234 may communicate with microcontroller 208 via line 224. In the example, diagnostic module 234 may be configured to output, to microcontroller 208, state information for high voltage converter 204 and microcontroller 208 is configured to receive the state information for high voltage converter 204. For example, as shown, diagnostic module 234 may communicate with microcontroller 208 via line 224. Additionally, or alternatively, microcontroller 208 may control high voltage converter 204 (e.g., switch high voltage converter 204 off) when low voltage buck converter 206 fails to provide a desired voltage (e.g., low voltage buck converter 206 is operating in an unsafe state).

Low voltage buck converter 206 may be an example of voltage converter 106. For example, low voltage buck converter 206 may be a buck converter that bucks a voltage (e.g., $V_{CC}$). As shown, low voltage buck converter 206 may output voltages $V_1$, $V_2$, $V_3$, $V_4$. In some examples, low voltage buck converter 206 may output fewer voltages (e.g., 1, 2, or 3) or more voltages (e.g., more than 5). In the example of FIG. 2, two or more of output voltages $V_1$, $V_2$, $V_3$, $V_4$ may be different. For example, output voltages $V_1$ may be 0.8 volts, $V_2$ may be 1.2 volts, $V_3$ may be 2 volts, and $V_4$ may be 4 volts. Additionally, or alternatively, two or more of output voltages $V_1$, $V_2$, $V_3$, $V_4$ may identical. For example, $V_1$ may be 0.8 volts, $V_2$ may be 0.8 volts, $V_3$ may be 2 volts, and $V_4$ may be 4 volts.

Low voltage buck converter 206 may be configured to selectively activate a high side switch and a low side switch to convert the second voltage (e.g., $V_{CC}$) to a third voltage (e.g., output voltages $V_1$, $V_2$, $V_3$, $V_4$). For example, low voltage buck converter 206 may convert the voltage received by low voltage buck converter 206 (e.g., $V_{CC}$) to $V_1$ by using a first duty cycle (e.g., 50%) such that $V_1$ is equal to half the voltage received by low voltage buck converter 206. In the example, low voltage buck converter 206 may convert the voltage received by low voltage buck converter 206 (e.g., $V_{CC}$) to $V_2$ by using a second duty cycle (e.g., 60%) such that $V_2$ is equal to 60% the voltage received by low voltage buck converter 206. In this manner, low voltage buck converter 206 may further buck a voltage output by high voltage converter 204 for use by microcontroller 208 and/or actuators 212.

Low voltage buck converter 206 may be configured to provide a safety crowbar based on whether high voltage converter 204 is operating in an unsafe state. For example, in response to receiving the indication that high voltage converter 204 is operating in the unsafe state, low voltage buck converter 206 may be configured to refrain from selectively activating the high side switch and the low side switch to convert the second voltage (e.g., $V_{CC}$) to a third voltage (e.g., output voltages $V_1$, $V_2$, $V_3$, $V_4$) and activate the high side switch and the low side switch to establish an electrical path between the second voltage and reference node 240 of the circuit 200.

In some examples, low voltage buck converter 206 may communicate with microcontroller 208 via line 222, which may be bi-direction or unidirectional. For example, low voltage buck converter 206 may be configured to output, to microcontroller 208, state information for low voltage buck converter 206 and microcontroller 208 is configured to receive the state information for low voltage buck converter 206.

Microcontroller 208 may be an example of controller 108 of FIG. 1. Microcontroller 208 may be configured to selectively activate actuators 212. For instance, microcontroller 208 may cause a switch to establish an electrical path between one or more of output voltages $V_1$, $V_2$, $V_3$, $V_4$ and actuators 212 based on sensor data from sensor 210. In some examples, microcontroller 208 may be configured to store state information for high voltage converter 204 and/or for low voltage buck converter 206 in event data recorder 214. For example, microcontroller 208 may cause event data recorder 214 to store state information corresponding to high voltage converter 204 and/or for low voltage buck converter 206.

In some examples, microcontroller 208 may be configured to determine whether high voltage converter 204 is operating in an unsafe state. For example, microcontroller 208 may determine, based on the state information from high voltage converter 204 and/or for low voltage buck converter 206, an operating state of high voltage converter 204. In the example, microcontroller 208 may output, to high voltage converter 204, an indication of the operating state. For instance, microcontroller 208 may output, to high voltage converter 204, via line 224, an indication of the operating state where a logical '1' indicates a safe state and a logical '0' indicates an unsafe state. In the example, high voltage converter 204 determines that high voltage converter 204 is operating in the unsafe state based on the indication of the operating state. For instance, high voltage converter 204 determines that high voltage converter 204 is operating in the safe state when high voltage converter 204 receives, via line 224, a logical '1' from microcontroller 208 and determines that high voltage converter 204 is operating in the unsafe state when high voltage converter 204 receives, via line 224, a logical '0' from microcontroller 208.

In some examples, microcontroller 208 may implement a hand-shaking process to restart circuit 200. More specifically, in response to determining a "false alarm," where diagnostic module 234 outputs an indication (e.g., via lines 220 and 224) that high voltage converter 204 is operating in an unsafe state and when microcontroller 208 determines that high voltage converter 204 is not operating in an unsafe state, microcontroller 208 may implement a hand-shaking process to restart circuit 200. For example, microcontroller 208 may determine a "false alarm" when high voltage converter 204 indicates, via line 224, that high voltage converter 204 is operating in an unsafe state and when microcontroller 208 determines that high voltage converter 204 is not operating in an unsafe state based on state information received, via lines 222 and 224. In the example, microcontroller 208 may output, to high voltage converter 204, via line 224, an instruction to re-start after determining the "false alarm." In this manner, a hand-shaking functionality may be used to improve a functionality of circuit 200 compared to circuits that omit line 224.

In accordance with one or more techniques of this disclosure, rather than propagating the overvoltage to other voltage converters, circuit 200 may output an indication of an unsafe state on lines 220-224 to activate a safety crowbar. For example, high voltage converter 204 may convert a first voltage (e.g., $V_{batt}$) to a second voltage (e.g., $V_{CC}$) and determine whether high voltage converter 204 is operating in an unsafe state. In response to determining that high voltage converter 204 is operating in the unsafe state, high voltage converter 204 may output an indication that high voltage converter 204 is operating in the unsafe state. For example, high voltage converter 204 may output, at line 220, to low voltage buck converter 206, an indication (e.g., a logical '1') that high voltage converter 204 is operating in the unsafe state. Additionally, or alternatively, in response to determining that high voltage converter 204 is operating in the unsafe state, high voltage converter 204 may output, at line 224, to microcontroller 208, an indication (e.g., a logical '1') that high voltage converter 204 is operating in the unsafe state and microcontroller 208 may, using a hand-shaking functionality, output, to high voltage converter 204, via line 224, an instruction to re-start after determining a "false alarm."

Figure 3:
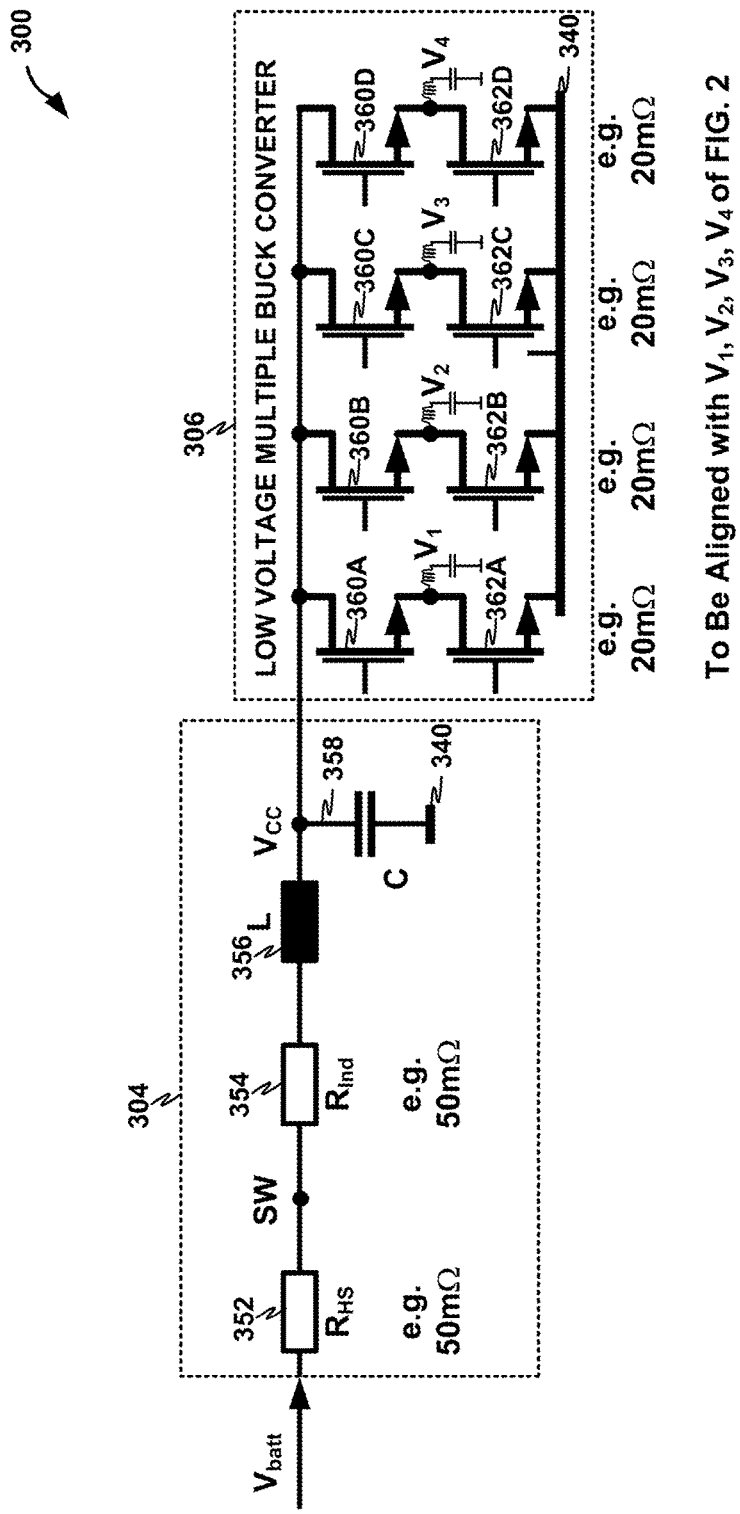
FIG. 3 is a block diagram illustrating an equivalent circuit diagram of a circuit using a safety crowbar, in accordance with one or more techniques of this disclosure.

FIG. 3 is a block diagram illustrating an equivalent circuit diagram of a circuit 300 using a safety crowbar, in accordance with one or more techniques of this disclosure. FIG. 3 is described below within the context of system 100 of FIG. 1 and/or circuit 200 of FIG. 2. However, the techniques described below can be used in any permutation, and in any combination, with voltage source 102, voltage converter 104, voltage converter 106, controller 108, sensor 110, load 112, log 114, and safety module 116 of FIG. 1, high voltage converter 204, low voltage buck converter 206, microcontroller 208, sensor 210, actuators 212, event data recorder 214, and safety module 216 of circuit 200 of FIG. 2. As illustrated in the example of FIG. 3, circuit 300 may include voltage converter 304, voltage converter 306. Voltage converter 304 may be an example of voltage converter 104 of FIG. 1 and/or high voltage converter 204 of FIG. 2. Voltage converter 306 may be an example of voltage converter 106 of FIG. 1 and/or low voltage buck converter 206 of FIG. 2.

As shown, voltage converter 304 may include inductive element 356, which may be an example of inductive element 236 of FIG. 2 and capacitive element 358, which may be an example of capacitive element 238 of FIG. 2. In the example of FIG. 3, an effective resistance 352 corresponds to a resistance of a high side switch of voltage converter 304. In some instances, the high side switch of voltage converter 304 has failed to switch off (e.g., operate in an closed state).

Similarly, an effective resistance 354 corresponds to a resistance of inductive element 356.

As shown, voltage converter 306 may include high side switches 360A, 360B, 360C, 360D (collectively, "high side switches 360") and low side switches 362A, 362B, 362C, 362D (collectively, "low side switches 362"). Voltage converter 306 may selectively activate high side switches 360 and low side switches 362 to convert the voltage output by voltage converter 304 to a set of voltages. However, in response to receiving an indication that voltage converter 304 is operating in an unsafe state, voltage converter 306 may refrain from selectively activating high side switches 360 and low side switches 362 to convert the voltage output by voltage converter 304 to the set of voltages and activate high side switches 360 and low side switches 362 to establish an electrical path between the voltage output by voltage converter 304 and a reference node 340 of the circuit 300.

In accordance with one or more techniques of this disclosure, rather than using further components to provide a safety crowbar to circuit 300, circuit 300 may activate a safety crowbar using voltage converter 306. In the example of FIG. 3, high side switches 360 and low side switches 362 may have a very low effective resistance. For example, high side switches 360 and low side switches 362 may each have an effective resistance of less than 10 milli-ohms. More specifically, high side switches 360 and low side switches 362 form a total resistance of 5 milli-ohms when all of the high side switches 360 and low side switches 362 are activated. However, the total resistance of voltage converter 304 is 100 milli-ohms, where effective resistance 352 is 50 milli-ohms and effective resistance 354 is 50 milli-ohms. In this manner, while voltage converter 306 may activate the safety crowbar, effective resistances 352 and 354 dissipate a substantial portion of the power delivered to circuit 300 (e.g., from $V_{batt}$). As used herein, a substantial portion of the power delivered may be greater than 80% of a power stored.

Figure 4A:
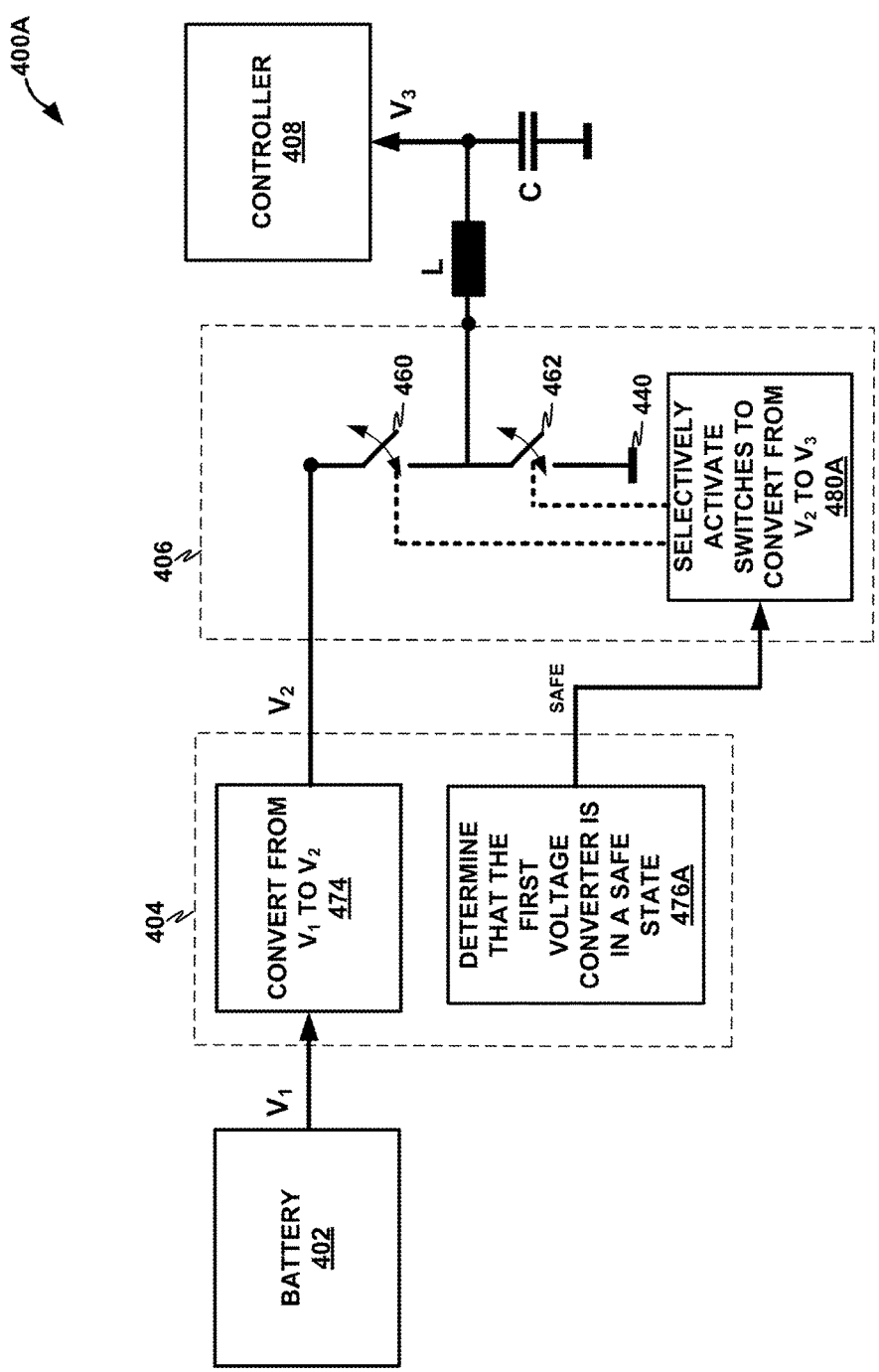
FIG. 4A is a block diagram illustrating a system using a safety crowbar when a first voltage converter is operating in a safe state, in accordance with one or more techniques of this disclosure.

FIG. 4A is a block diagram illustrating a system 400A using a safety crowbar when a first voltage converter 404 is operating in a safe state, in accordance with one or more techniques of this disclosure. FIG. 4A is described below within the context of system 100 of FIG. 1, circuit 200 of FIG. 2, and circuit 300 of FIG. 3. However, the techniques described below can be used in any permutation, and in any combination, with voltage source 102, voltage converter 104, voltage converter 106, controller 108, sensor 110, load 112, log 114, and safety module 116 of FIG. 1, high voltage converter 204, low voltage buck converter 206, microcontroller 208, sensor 210, actuators 212, event data recorder 214, and safety module 216 of circuit 200 of FIG. 2, and voltage converters 304 and 306 of FIG. 3. As illustrated in the example of FIG. 4A, system 400A may include battery 402, first voltage converter 404, second voltage converter 406, and controller 408. Battery 402 may be an example of voltage source 102 of FIG. 1 and controller 408 may be an example of controller 108 of FIG. 1 and/or microcontroller 208 of FIG. 2.

First voltage converter 404 may be an example of voltage converter 104 of FIG. 1, high voltage converter 204 of FIG. 2, and/or voltage converter 304 of FIG. 3. In the example of FIG. 4A, first voltage converter 404 converts a first voltage (e.g., $V_1$) to a second voltage (e.g., $V_2$) (474). Additionally, first voltage converter 404 determines whether first voltage converter 404 is operating in an unsafe state. As shown, first voltage converter 404 determines that first voltage converter 404 is not operating in an unsafe state (e.g., is operating in a safe state) (476A). In response to determining that first voltage converter 404 is not operating in the unsafe state, first voltage converter 404 outputs, to second voltage converter 406 an indication that first voltage converter 404 is operating in the safe state (e.g., a logical '1').

Second voltage converter 406 may be an example of voltage converter 106 of FIG. 1, low voltage buck converter 206 of FIG. 2, and/or voltage converter 306 of FIG. 3. As shown, second voltage converter 406 may include a high side switch 460, which may be an example of high side switches 360 of FIG. 3 and a low side switch 462, which may be an example of low side switches 362 of FIG. 3. In the example of FIG. 4A, second voltage converter 406 selectively activates high side switch 460 and low side switch 462 to convert the second voltage (e.g., $V_2$) to a third voltage (e.g., $V_3$) (480A). More specifically, in response to second voltage converter 406 receiving, from first voltage converter 404, the indication that first voltage converter 404 is operating in the safe state, second voltage converter 406 selectively activates high side switch 460 and low side switch 462 to convert the second voltage to a third voltage (480A).

FIG. 4B is a block diagram illustrating a system 400B using a safety crowbar when first voltage converter 404 of FIG. 4A is operating in an unsafe state, in accordance with one or more techniques of this disclosure. In the example of FIG. 4B, rather than first voltage converter 404 determining that first voltage converter 404 is not operating in an unsafe state, first voltage converter 404 determines that first voltage converter 404 is operating in the unsafe state (476B). For instance, first voltage converter 404 determines that the voltage output by first voltage converter 404 is unsafe (e.g., $V_{UNSAFE}$ is greater than 80% of the first voltage (e.g., $V_1$)). In response to determining that first voltage converter 404 is not operating in the unsafe state, first voltage converter 404 outputs, to second voltage converter 406 an indication that first voltage converter 404 is operating in the unsafe state (e.g., a logical '0').

In response to receiving the indication that first voltage converter 404 is operating in the unsafe state, second voltage converter 406 refrains from selectively activating high side switch 460 and low side switch 462 to convert the second voltage (e.g., $V_2$) to the third voltage (e.g., $V_3$) as shown in FIG. 4A and activates high side switch 460 and low side switch 462 to establish an electrical path between the second voltage converter 406 (e.g., $V_2$) and a reference node 440 of the system 400B (480B). In this manner, rather than propagating the overvoltage ($V_{UNSAFE}$) to second voltage converter 406, first voltage converter 404 may output an indication of an unsafe state to cause second voltage converter 406 to activate a safety crowbar that protects controller 408 and/or a black box (e.g., log 114 of FIG. 1, event data recorder 214 of FIG. 2, etc.) from an unsafe voltage.

Figure 5:
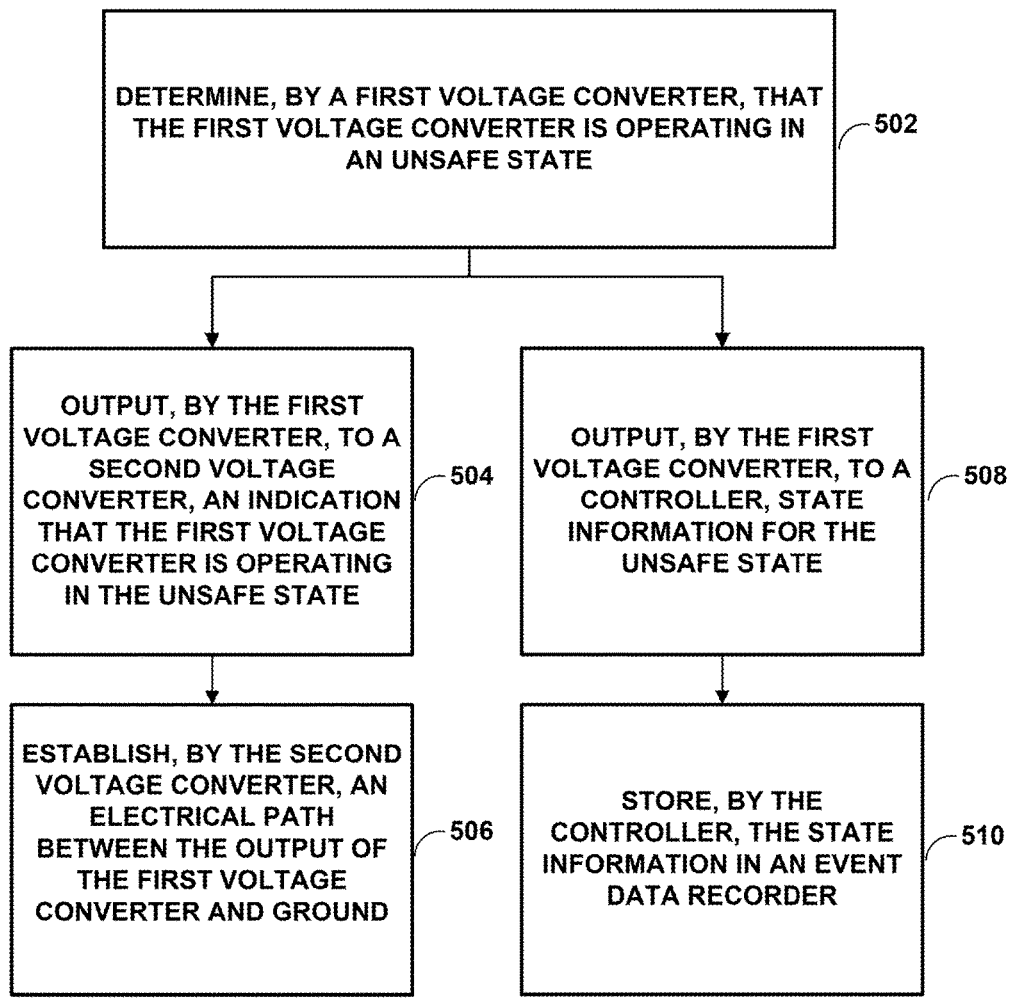
FIG. 5 is a flow diagram consistent with techniques that may be performed by a circuit in accordance with this disclosure.

FIG. 5 is a flow diagram consistent with techniques that may be performed by a circuit in accordance with this disclosure. FIG. 5 is described below within the context of system 100 of FIG. 1, circuit 200 of FIG. 2, circuit 300 of FIG. 3, system 400A of FIG. 4A, and system 400B of FIG. 4B. However, the techniques described below can be used in any permutation, and in any combination, with voltage source 102, voltage converter 104, voltage converter 106, controller 108, sensor 110, load 112, log 114, and safety module 116 of FIG. 1, high voltage converter 204, low voltage buck converter 206, microcontroller 208, sensor 210, actuators 212, event data recorder 214, and safety module 216 of circuit 200 of FIG. 2, voltage converters 304 and 306 of FIG. 3, and first voltage converter 404 and second voltage converter 406 of FIGS. 4A and 4B.

In accordance with one or more techniques of this disclosure, a first voltage converter may determine that the first voltage converter is operating in an unsafe state (502). For example, voltage converter 104 may determine that voltage converter 104 is operating in an unsafe state based on a voltage output by voltage converter 104, a voltage at an inductive element of voltage converter 104, and/or a detected duty cycle at voltage converter 104.

The first voltage converter outputs to a second voltage converter, an indication that the first voltage converter is operating in the unsafe state (504). For example, voltage converter 104 outputs, via line 120, to voltage converter 106, an indication that the that voltage converter 104 is operating in the unsafe state. The second voltage converter establishes an electrical path between the output of the first voltage converter and ground (506). For example, voltage converter 306 activates high side switches 360 and low side switches 362 to provide a safety crowbar that rapidly short-circuits the output of voltage converter 304 to ground 340. In some examples, second voltage converter 406 of FIG. 4 activates high side switch 460 and low side switch 462 to provide a safety crowbar that rapidly short-circuits the output of second voltage converter 404 to ground 440.

The first voltage converter outputs to a controller, state information for the unsafe state (508). For example, voltage converter 104 outputs, via line 124, to controller 108, an indication that the that voltage converter 104 is operating in the unsafe state. The controller stores the state information in an event data recorder (510). For example, controller 108 stores the state information in log 114 of FIG. 1 and/or event data recorder 214 of FIG. 2.

The following examples may illustrate one or more aspects of the disclosure.

Example 1

A circuit comprising: a first voltage converter configured to: convert a first voltage to a second voltage; determine whether the first voltage converter is operating in an unsafe state; and in response to determining that the first voltage converter is operating in the unsafe state, output an indication that the first voltage converter is operating in the unsafe state; and a second voltage converter configured to: selectively activate a high side switch and a low side switch to convert the second voltage to a third voltage; and in response to receiving the indication that the first voltage converter is operating in the unsafe state: refrain from selectively activating the high side switch and the low side switch to convert the second voltage to the third voltage; and activate the high side switch and the low side switch to establish an electrical path between the second voltage and a reference node of the circuit.

Example 2

The circuit of example 1, wherein the first voltage converter is further configured to: determine whether the second voltage exceeds a threshold voltage, wherein the first voltage converter determines that the first voltage converter is operating in the unsafe state in response to determining that the second voltage exceeds the threshold voltage.

Example 3

The circuit of any of examples 1-2 or combinations thereof, wherein: the first voltage is a battery voltage at a battery of the circuit; and the voltage threshold is less than the battery voltage at the battery.

Example 4

The circuit of any of examples 1-3 or combinations thereof, further comprising an inductive element having a first node and a second node, the first voltage converter being further configured to: convert the first voltage to the second voltage by establishing an electrical path between the first voltage converter and the first node of the inductive element during a first portion of a duty cycle and refraining from establishing the electrical path between the first voltage converter and the first node of the inductive element during a second portion of the duty cycle; and determine whether a voltage at the first node of the inductive element exceeds a threshold voltage during the second portion of the duty cycle, wherein the first voltage converter determines that the first voltage converter is operating in the unsafe state in response to determining that the voltage at the first node of the inductive element exceeds the threshold voltage during the second portion of the duty cycle Example 5

The circuit of any of examples 1-4 or combinations thereof, further comprising: a capacitive element having a first node coupled to the second node of the inductive element and a second node coupled to the reference node of the circuit, wherein the capacitive element outputs the second voltage.

Example 6

The circuit of any of examples 1-5 or combinations thereof, wherein the first voltage converter is further configured to: convert the first voltage to the second voltage by outputting, to a switch, a signal indicating a target duty cycle that selectively switches in the switch to convert the first voltage to the second voltage; and detect a duty cycle of the switch, wherein the first voltage converter determines that the first voltage converter is operating in the unsafe state based the detected duty cycle of the switch.

Example 7

The circuit of any of examples 1-6 or combinations thereof, wherein the first voltage converter determines that the first voltage converter is operating in the unsafe state further based on a comparison of the target duty cycle and the detected duty cycle.

Example 8

The circuit of any of examples 1-7 or combinations thereof, further comprising a controller configured to selectively activate a load device using the third voltage, wherein the first voltage converter is further configured to output, to the controller, state information for the first voltage converter, and wherein the controller is further configured to receive the state information for the first voltage converter.

Example 9

The circuit of any of examples 1-8 or combinations thereof, wherein the controller is further configured to store the state information for the first voltage converter in a log.

Example 10

The circuit of any of examples 1-9 or combinations thereof, wherein: the state information for the first voltage converter is first state information; the second voltage converter is further configured to output, to the controller, second state information for the first voltage converter; the controller is further configured to: determine, based on the first and second state information, an operating state of the first voltage converter; and output, to the first voltage converter, an indication of the operating state; and the first voltage converter determines that the first voltage converter is operating in the unsafe state based on the indication of the operating state.

Example 11

A method comprising: determining, by a first voltage converter configured to convert a first voltage to a second voltage, whether the first voltage converter is operating in an unsafe state; in response to determining that the first voltage converter is operating in the unsafe state, outputting, by the first voltage converter to a second voltage converter configured to convert the second voltage to a third voltage, an indication that the first voltage converter is operating in the unsafe state; and in response to the second voltage converter receiving the indication that the first voltage converter is operating in the unsafe state, establishing, by a high side switch and a low side switch of the second voltage converter, an electrical path between the first voltage and a reference node.

Example 12

The method of example 11, further comprising: determining, by the first voltage converter, whether the second voltage exceeds a threshold voltage, wherein the first voltage converter determines that the first voltage converter is operating in the unsafe state in response to determining that the second voltage exceeds the threshold voltage.

Example 13

The method of any of examples 11-12 or combinations thereof, further comprising: converting, by the first voltage converter, the first voltage to the second voltage by establishing an electrical path between the first voltage converter and a first node of an inductive element during a first portion of a duty cycle and refraining from establishing the electrical path between the first voltage converter and the first node of the inductive element during a second portion of the duty cycle; and determining, by the first voltage converter, whether a voltage at the first node of the inductive element exceeds a threshold voltage during the second portion of the duty cycle, wherein the first voltage converter determines that the first voltage converter is operating in the unsafe state in response to determining that the voltage at the first node of the inductive element exceeds the threshold voltage during the second portion of the duty cycle.

Example 14

The method of any of examples 11-13 or combinations thereof, further comprising: converting, by the first voltage converter, the first voltage to the second voltage by outputting, to a switch, a signal indicating a target duty cycle that switches in the switch to convert the first voltage to the second voltage; and detecting, by the first voltage converter, a duty cycle of the switch, wherein the first voltage converter determines that the first voltage converter is operating in the unsafe state based the detected duty cycle of the switch.

Example 15

The method of any of examples 11-14 or combinations thereof, further comprising: selectively activating, by a controller, a load device using the third voltage; and outputting, by the first voltage converter, to the controller, first state information for the first voltage converter; outputting, by the second voltage converter, to the controller, second state information for the first voltage converter; determining, by the controller, based on the first and second state information, an operating state of the first voltage converter; and outputting, by the controller, to the first voltage converter, an indication of the operating state, wherein the first voltage converter determines that the first voltage converter is operating in the unsafe state based on the indication of the operating state.

Example 16

The method of any of examples 11-15 or combinations thereof, wherein the controller is further configured to store the first and second state information in a log.

Example 17

A system comprising: a first voltage converter configured to: convert a first voltage to a second voltage; determine whether the first voltage converter is operating in an unsafe state; and in response to determining that the first voltage converter is operating in the unsafe state, output an indication that the first voltage converter is operating in the unsafe state; and a second voltage converter configured to: receive the second voltage and the indication that the first voltage converter is operating in the unsafe state from the first voltage converter; selectively activate a set of high side switches and a set of low side switches to convert the second voltage to a set of voltages; and in response to receiving the indication that the first voltage converter is operating in the unsafe state: refrain from selectively activating the set of high side switches and the set of low side switches to convert the second voltage to the set of voltages; and activate the set of high side switches and the set of low side switches to establish an electrical path between the second voltage and a reference node of the circuit.

Example 18

The system of example 17, further comprising a controller configured to: selectively activate a set of load devices by establishing an electrical path between each load device of the set of load devices and a respective voltage of the set of voltages.

Example 19

The system of any of examples 17-18 or combinations thereof, wherein the controller is further configured to: receive, from the first voltage converter, the indication that the first voltage converter is operating in the unsafe state and first state information; receive, from the second voltage converter, second state information; and in response to receiving the indication that the first voltage converter is operating in the unsafe state, store the first and second state information in an event data recorder.

Example 20

The system of any of examples 17-19 or combinations thereof, wherein the controller is further configured to: determine, based on the first and second state information, an operating state of the first voltage converter; and output to the first voltage converter, an indication of the operating state, wherein the first voltage converter determines that the first voltage converter is operating in the unsafe state based on the indication of the operating state.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A circuit comprising:
a first voltage converter configured to:
convert a first voltage to a second voltage;
determine whether the first voltage converter is operating in an unsafe state; and
in response to determining that the first voltage converter is operating in the unsafe state, output an indication that the first voltage converter is operating in the unsafe state; and
a second voltage converter configured to:
selectively activate a high side switch and a low side switch to convert the second voltage to a third voltage; and
in response to receiving the indication that the first voltage converter is operating in the unsafe state:
refrain from selectively activating the high side switch and the low side switch to convert the second voltage to the third voltage; and
activate the high side switch and the low side switch to establish an electrical path between the second voltage and a reference node of the circuit.

2. The circuit according to claim 1, wherein the first voltage converter is further configured to:
determine whether the second voltage exceeds a threshold voltage,
wherein the first voltage converter determines that the first voltage converter is operating in the unsafe state in response to determining that the second voltage exceeds the threshold voltage.

3. The circuit according to claim 2, wherein:
the first voltage is a battery voltage at a battery of the circuit; and
the voltage threshold is less than the battery voltage at the battery.

4. The circuit according to claim 1, further comprising an inductive element having a first node and a second node, the first voltage converter being further configured to:
convert the first voltage to the second voltage by establishing an electrical path between the first voltage converter and the first node of the inductive element during a first portion of a duty cycle and refraining from establishing the electrical path between the first voltage converter and the first node of the inductive element during a second portion of the duty cycle; and
determine whether a voltage at the first node of the inductive element exceeds a threshold voltage during the second portion of the duty cycle,
wherein the first voltage converter determines that the first voltage converter is operating in the unsafe state in response to determining that the voltage at the first node of the inductive element exceeds the threshold voltage during the second portion of the duty cycle.

5. The circuit according to claim 4, further comprising:
a capacitive element having a first node coupled to the second node of the inductive element and a second node coupled to the reference node of the circuit,
wherein the capacitive element outputs the second voltage.

6. The circuit according to claim 1, wherein the first voltage converter is further configured to:
convert the first voltage to the second voltage by outputting, to a switch, a signal indicating a target duty cycle that selectively switches in the switch to convert the first voltage to the second voltage; and
detect a duty cycle of the switch, wherein the first voltage converter determines that the first voltage converter is operating in the unsafe state based the detected duty cycle of the switch.

7. The circuit according to claim 6, wherein the first voltage converter determines that the first voltage converter is operating in the unsafe state further based on a comparison of the target duty cycle and the detected duty cycle.

8. The circuit according to claim 1, further comprising a controller configured to selectively activate a load device using the third voltage,
wherein the first voltage converter is further configured to output, to the controller, state information for the first voltage converter, and
wherein the controller is further configured to receive the state information for the first voltage converter.

9. The circuit according to claim 8, wherein the controller is further configured to store the state information for the first voltage converter in a log.

10. The circuit according to claim 8, wherein:
the state information for the first voltage converter is first state information;

the second voltage converter is further configured to output, to the controller, second state information for the first voltage converter;

the controller is further configured to:
   determine, based on the first and second state information, an operating state of the first voltage converter; and
   output, to the first voltage converter, an indication of the operating state; and the first voltage converter determines that the first voltage converter is operating in the unsafe state based on the indication of the operating state.

11. A method comprising:
   determining, by a first voltage converter configured to convert a first voltage to a second voltage, whether the first voltage converter is operating in an unsafe state;
   in response to determining that the first voltage converter is operating in the unsafe state, outputting, by the first voltage converter to a second voltage converter configured to convert the second voltage to a third voltage, an indication that the first voltage converter is operating in the unsafe state; and
   in response to the second voltage converter receiving the indication that the first voltage converter is operating in the unsafe state, establishing, by a high side switch and a low side switch of the second voltage converter, an electrical path between the first voltage and a reference node.

12. The method according to claim 11, further comprising:
   determining, by the first voltage converter, whether the second voltage exceeds a threshold voltage,
   wherein the first voltage converter determines that the first voltage converter is operating in the unsafe state in response to determining that the second voltage exceeds the threshold voltage.

13. The method according to claim 11, further comprising:
   converting, by the first voltage converter, the first voltage to the second voltage by establishing an electrical path between the first voltage converter and a first node of an inductive element during a first portion of a duty cycle and refraining from establishing the electrical path between the first voltage converter and the first node of the inductive element during a second portion of the duty cycle; and
   determining, by the first voltage converter, whether a voltage at the first node of the inductive element exceeds a threshold voltage during the second portion of the duty cycle,
   wherein the first voltage converter determines that the first voltage converter is operating in the unsafe state in response to determining that the voltage at the first node of the inductive element exceeds the threshold voltage during the second portion of the duty cycle.

14. The method according to claim 11, further comprising:
   converting, by the first voltage converter, the first voltage to the second voltage by outputting, to a switch, a signal indicating a target duty cycle that switches in the switch to convert the first voltage to the second voltage; and
   detecting, by the first voltage converter, a duty cycle of the switch, wherein the first voltage converter determines that the first voltage converter is operating in the unsafe state based the detected duty cycle of the switch.

15. The method according to claim 11, further comprising:
   selectively activating, by a controller, a load device using the third voltage; and outputting, by the first voltage converter, to the controller, first state information for the first voltage converter;
outputting, by the second voltage converter, to the controller, second state information for the first voltage converter;
determining, by the controller, based on the first and second state information, an operating state of the first voltage converter; and
outputting, by the controller, to the first voltage converter, an indication of the operating state,
wherein the first voltage converter determines that the first voltage converter is operating in the unsafe state based on the indication of the operating state.

16. The method according to claim 15, wherein the controller is further configured to store the first and second state information in a log.

17. A system comprising:
   a first voltage converter configured to:
      convert a first voltage to a second voltage;
      determine whether the first voltage converter is operating in an unsafe state; and
      in response to determining that the first voltage converter is operating in the unsafe state, output an indication that the first voltage converter is operating in the unsafe state; and
   a second voltage converter configured to:
      receive the second voltage and the indication that the first voltage converter is operating in the unsafe state from the first voltage converter;
      selectively activate a set of high side switches and a set of low side switches to convert the second voltage to a set of voltages; and
      in response to receiving the indication that the first voltage converter is operating in the unsafe state:
         refrain from selectively activating the set of high side switches and the set of low side switches to convert the second voltage to the set of voltages; and
         activate the set of high side switches and the set of low side switches to establish an electrical path between the second voltage and a reference node of the circuit.

18. The system according to claim 17, further comprising a controller configured to:
   selectively activate a set of load devices by establishing an electrical path between each load device of the set of load devices and a respective voltage of the set of voltages.

19. The system according to claim 18, wherein the controller is further configured to:
   receive, from the first voltage converter, the indication that the first voltage converter is operating in the unsafe state and first state information;
   receive, from the second voltage converter, second state information; and
   in response to receiving the indication that the first voltage converter is operating in the unsafe state, store the first and second state information in an event data recorder.

20. The system according to claim 19, wherein the controller is further configured to:
   determine, based on the first and second state information, an operating state of the first voltage converter; and
   output to the first voltage converter, an indication of the operating state,
   wherein the first voltage converter determines that the first voltage converter is operating in the unsafe state based on the indication of the operating state.

* * * * *